(12) United States Patent
Ellis, Jr.

(10) Patent No.: US 6,409,888 B1
(45) Date of Patent: Jun. 25, 2002

(54) METHOD AND APPARATUS FOR WATER DEGASIFICATION AND DISTILLATION

(76) Inventor: John C. Ellis, Jr., Westbrook Farms, Rte. 209, Westbrookville, NY (US) 12785

( * ) Notice: Subject to any disclaimer, the term of this patent is extended or adjusted under 35 U.S.C. 154(b) by 0 days.

(21) Appl. No.: 09/527,023

(22) Filed: Mar. 16, 2000

(51) Int. Cl.$^7$ .............................. B01D 3/02; B01D 3/42; B01D 19/00; C02F 1/04; C02F 1/78
(52) U.S. Cl. ............................. 203/10; 95/241; 203/1; 203/2; 203/39; 203/49; 203/22; 203/DIG. 8; 210/748; 210/760; 210/774
(58) Field of Search .................. 203/10, 1, 31, 203/100, 2, 4, 40, 49, 22, 27, DIG. 8, 39; 202/176, 177, 202, 203, 181, 160, 182, 175, 200, 265; 210/748, 760, 774; 95/241, 244

(56) References Cited

U.S. PATENT DOCUMENTS

| | | | |
|---|---|---|---|
| 4,640,769 A | * 2/1987 | Weihoff | 210/180 |
| 4,735,728 A | * 4/1988 | Wemhoff | 210/668 |
| 4,940,134 A | * 7/1990 | Aoki et al. | 202/202 |
| 5,203,970 A | 4/1993 | Ellis, Jr. | |
| 5,205,906 A | * 4/1993 | Grutsch et al. | 159/47.3 |
| 5,248,395 A | * 9/1993 | Rastelli et al. | 205/10 |
| 5,445,714 A | * 8/1995 | Myers | 202/176 |

* cited by examiner

Primary Examiner—Virginia Manoharan
(74) Attorney, Agent, or Firm—Foley & Lardner

(57) ABSTRACT

A method and apparatus for water degasification and distillation in an apparatus having a container for a reservoir of water to be degassed and distilled, a relatively small boiler adjoining the container and having a feed water conduit connecting the container and boiler so that a selected water level in the container will fill the boiler to the same level, a coiled tube condenser within the container immersed in the water therein, the condenser coil having a vertically disposed longitudinal axis, a second conduit in the boiler connecting the space above the water level therein to the inlet of the condenser so that steam flows from the boiler to the condenser, an outlet on the condenser extending through a container wall for discharging the condensed steam as degassed distilled water, a heater in the boiler for heating the water therein, a motor driven stirrer axially of the coiled tube condenser for generating a swirling movement of the reservoir water with formation of steam bubbles therein and an ozone generating device in the boiler for purifying the steam. Optionally, an oversized filter is mounted at the outlet of the condenser.

4 Claims, 4 Drawing Sheets

METHOD AND APPARATUS FOR WATER DEGASIFICATION AND DISTILLATION

BACKGROUND OF THE INVENTION

1. Field of the Invention

This invention relates to a distilling apparatus and more specifically to a novel and improved water degasification and distillation apparatus embodying improved means for eliminating and/or neutralizing contaminants in the steam phase prior to condensation.

2. Description of the Related Art

Known water distilling apparatus generally comprise: a closed boiler; means for continuously feeding water to the boiler; means for removing and means for condensing the steam and other vapors evolved in the boiler. As the water in the boiler is being heated to produce steam, any air in the boiler is forced out. In addition, volatilizable chemical components present in the water will boil off and combine with the steam being evolved. Because there is no air in the boiler, the volatile impurities cannot be oxidized. The steam together with the volatilized chemical components will become condensed in the condenser so that the resultant distillate will contain therein the (volatile) chemicals. In instances wherein the raw water exhibits a disagreeable odor such as is produced by sulfur compounds and the like, most of the known to the art distillation apparatus will tend to concentrate the odor compound in the distillate and make the distilled water even more distasteful than the raw water. The inventor hereof has long been concerned with this problem and is the inventor of several patents directed to improved water distillation and degasification systems.

The water distilling apparatus of this invention relates to the apparatus described in Applicant's prior patents U.S. Pat. Nos. 4,420,374, 4,612,090 and 5,203,970, which patents in turn constitute an improvement over the apparatus disclosed in Applicant's earlier patent U.S. Pat. No. 4,339,307. Briefly, the water distilling apparatus described in the above-referenced patents U.S. Pat. Nos. 4,420,374, 4,612,090 and 5,203,970 comprises a very small boiler containing therein an instantaneous heating means and a reservoir for the boiler much larger than the boiler. A condensing coil is immersed within the reservoir so the water in the reservoir functions to cool the condenser. An open connection between reservoir and boiler provides an automatic water supply for the boiler.

The water in the reservoir circulates to and from the boiler, and the boiler heat thus imparted directly to the water in the reservoir together with the heat imparted to the reservoir water from the condenser heats the reservoir water to a temperature that will effectively deaerate the water in the reservoir and boil off any volatilizable constituents present in the water in the reservoir.

The water degasification and distillation apparatus in accordance with these above-referenced patents and in accordance with the invention hereof, comprises in more detail, a relatively large reservoir container adapted to receive the water to be distilled and a small boiler mounted on and to one side of the reservoir. A fluid conduit connects the boiler and the reservoir so that the liquid level in the boiler will be controlled to the liquid level in the reservoir. A vapor outlet in the boiler above the water level thereof is coupled to the condenser coil disposed within the reservoir container and the condensate outlet of the condenser coil extends through the wall of the reservoir container. The condenser coil is positioned so that the liquid in the reservoir will cover a major part or all of the condenser coil. With this arrangement and with the heater(s) in the boiler energized, the water in the boiler will heat to boiling almost instantaneously and the steam generated in the boiler will be fed out to the condenser. Whenever the steam generated within the boiler exceeds the capacity of the boiler outlet to the condenser to remove the steam from the boiler the steam pressure will force water in the boiler through the fluid conduit back into the reservoir. Then, when the steam pressure is relieved (by outflow of water to the reservoir and of steam to the condenser), water will again flow from the reservoir into the boiler. Pulsation and recirculation of water as just described continues throughout during the operation of the distillation apparatus.

Since hot boiler water is returned to the reservoir through the fluid conduit periodically through the pulsation and since heat from the condenser is continuously added to the water within the reservoir, all water fed to the reservoir increases in temperature. In a word, the reservoir water becomes hot. Desirably, all undesirable volatile material contained in the water fed to the boiler is vaporized prior to entry of the water into the boiler and distillation thereof.

The cold water initially fed to the reservoir (at the top thereof) will normally sink to the bottom of the reservoir while hot water periodically recirculated from the boiler back into the reservoir container (near the bottom) will tend to rise. Thus, the water within the reservoir container tank is in constant movement and is mixing so that desirably all the water of the reservoir is maintained at about the same substantially elevated temperature so as to evolve the undesirable volatilizable components from the reservoir water before the water enters the boiler.

SUMMARY OF THE INVENTION

According to the present invention an ozone generator is placed in the boiler of a distillation or degasification apparatus. When water is forced back into the reservoir, a vacuum is created in the boiler which sucks in air through the condenser. The oxygen in the air is then turned into ozone, a strong oxidizing agent, with the ozone generator. Steam formed in the boiler must pass through the ozone before entering the condenser and therefore any contaminants in the steam are destroyed.

Discussion of the Invention

Ozone is a thermally unstable allotrope of oxygen. It is a powerful oxidizing agent which has seen increased industrial use in bleaching and chemical manufacturing processes requiring strong oxidizing agents. In the laboratory, ozone is usually generated by passing an electric spark through a stream of oxygen. However, ozone may also be prepared by exposing oxygen to ultraviolet light. Because ozone is such a strong oxidizing agent, it is receiving much attention for use in water purification.

The unique design of the degasification and distillation apparatus of this invention results in hot boiler water periodically returning to the reservoir. The flow of water into the reservoir generates a vacuum in the boiler. Air is sucked through the condenser into the boiler to fill the vacuum. By placing an ozone generator in the boiler, the oxygen in the air is oxidized into ozone. When the stream pressure is relieved, water again flows from the reservoir to the boiler. Steam generated in the boiler must now flow through ozone before entering the condenser. The ozone destroys and/or neutralizes any impurities in the water and this results in the production of very pure water. In addition, the oxygen level in the water is increased, improving the taste of the water.

Apparatus of the Invention

In the apparatus of this invention an ozone generator is placed in the boiler. The ozone generator is preferably placed above the water line where it can interact with the air brought in through the condenser during the periodic pulsation of the water in the boiler. Typically, the ozone generator makes ozone by generating an electric spark. However, the use of an electric spark for generating ozone is not necessary. Any process for generating ozone from air is sufficient for the operation of the invention.

Optionally included in the distillation apparatus of the invention may be a stirrer as taught in U.S. Pat. No. 5,203,970. The stirrer preferably is made part of a fan assembly such as the fan assembly that forms part of the distillation apparatus described in the related patents U.S. Pat. Nos. 4,420,374 and 4,612,890. Conveniently, the stirrer rod can be made an extension of the fan rotor. Advantageously, the fan removes the steam and gases that bubble up from the reservoir water.

Optionally included in the distillation apparatus of this invention may be a deflector insert in the conduit connecting reservoir and boiler and/or in the condenser coil tubing. The deflector(s) generates spin and turbulence in the water passing between reservoir and boiler, and/or causes turbulent fluid flow adjacent the tubular wall of the condenser coil.

Optionally included in the distillation apparatus may be an oversized filter, desirably a charcoal filter, at the delivery end of the condenser.

The above and other advantages of the invention will become more apparent from the following description and accompanying drawings forming part of this Application.

DETAILED DESCRIPTION OF THE PREFERRED EMBODIMENT

Figure 1:
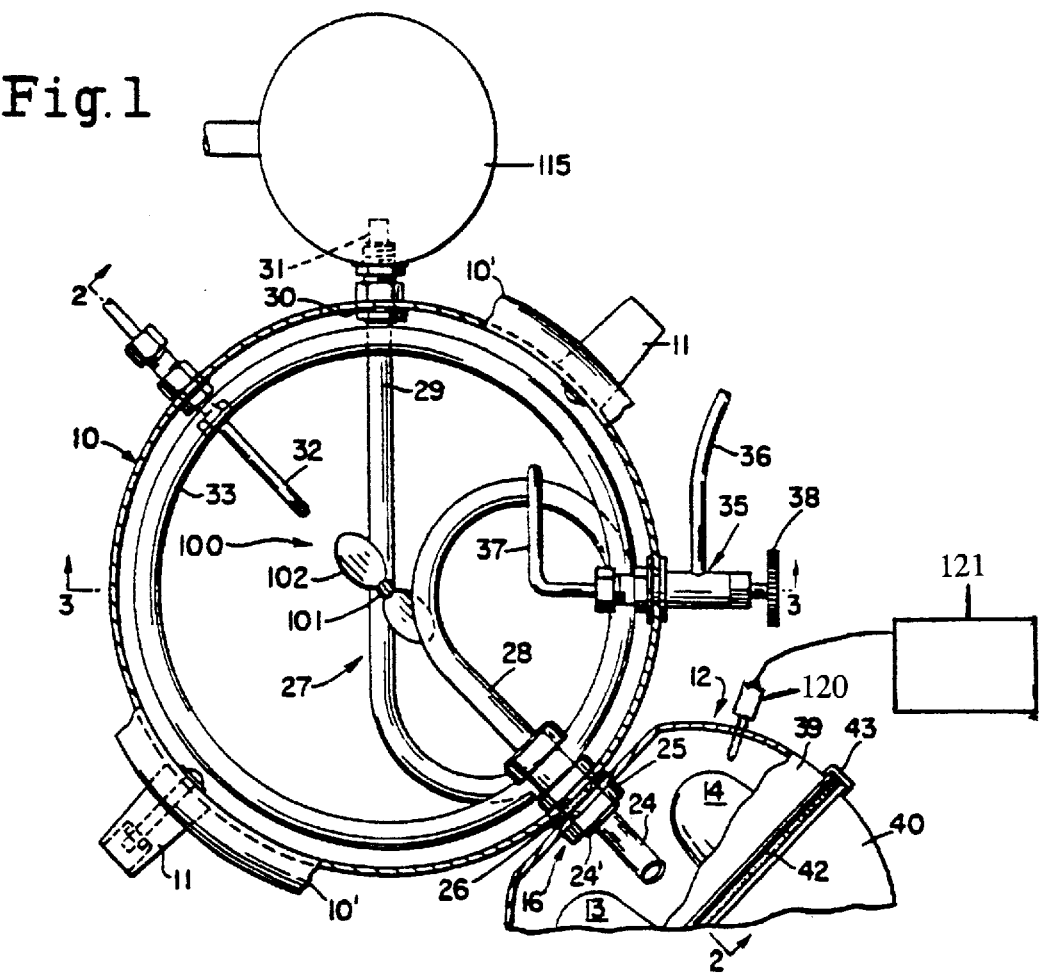
FIG. 1 is a fragmentary plan view of one embodiment of the distilling apparatus in accordance with the invention.
Figure 2:
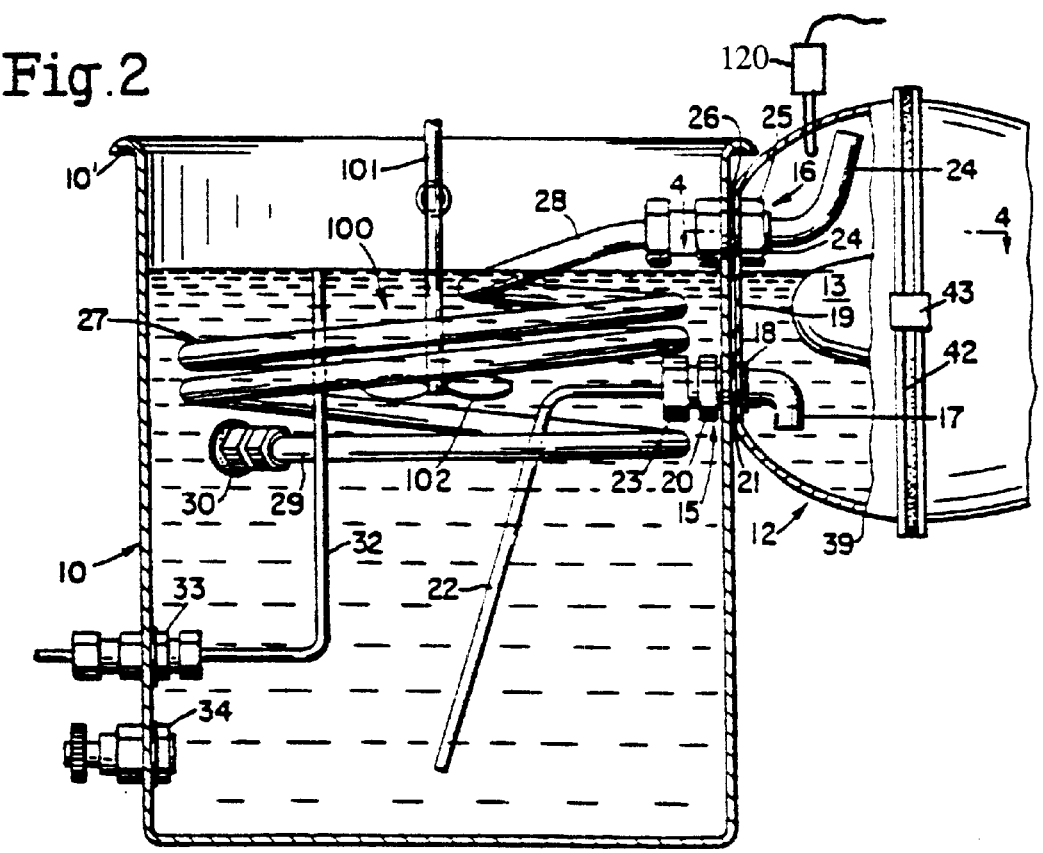
FIG. 2 is a cross sectional view of FIG. 1 taken along the line 2—2 thereof.

Referring now to the drawings and more specifically to FIGS. 1 and 2 it may be seen that the distilling apparatus in accordance with this invention comprises a cylindrical tank reservoir container 10 having a pair of handles 11 secured to the side thereof. A boiler 12 having instantaneous heating elements 13 and 14 therein is affixed to the side of the tank 10 by the fluid connectors 15 and 16. The fluid connector 15 includes an elbow 17 having a shoulder 18 and a threaded shank extending through cooperating openings in the wall 19 of the boiler 12 and the wall of the container 10. A nut 20 engages the shank of the fitting 15 and together with a resilient washer 21 provides a water-tight seal for both the tank 10 and the boiler 12. A water inlet conduit 22 is fixedly coupled to the fitting 15 by means of a nut 23 so that water within reservoir container 10 will automatically feed into the boiler 12 until the water level within boiler 12 corresponds to the reservoir water level inside reservoir container 10. It will also be observed that the water level is maintained at a level adequate to effect total or at least substantial immersion of the heating elements 13 and 14 in the water of boiler 12.

The steam outlet fitting 16 is of conventional construction and includes an outlet pipe 24, a threaded shank 24' extending through the walls of reservoir container 10 and boiler 12 and secured thereto by a nut 25. A sealing washer 26 is disposed between container and boiler to provide a water-tight connection. In the preferred embodiment of the invention herein illustrated the condenser 27 is in the form of a coiled tube of metal such as stainless steel, copper or the like and has the inlet end portion 28 sealably connected to the fitting 16 within container 10. The outlet 29 of the condenser 27 has a fitting 30 extending through the wall of container 10 and provides the condensate outlet 31. Optionally, but desirably an oversized filter 115 is interposed at condensate outlet 31. As best may be seen in FIG. 1, the coiled condenser tubing generates a cylindrical region 100 at the center of the reservoir container 10. Reservoir container 10 further includes an overflow pipe 32 which is connected to a fitting 33 sealed to the wall of the container 10 and a drain cock 34 for draining water from the container (being useful for cleaning and maintenance). A water inlet valve 35 is at the upper portion of the reservoir container 10 and has an inlet 36, an outlet 37 and a hand-wheel 38 for regulating the water supply in order to maintain an appropriate supply of water to the reservoir container 10.

Figure 4:
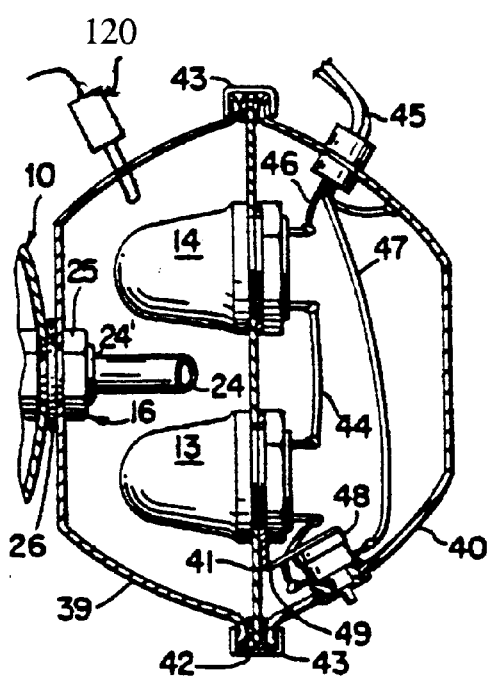
FIG. 4 is a cross sectional view showing the boiler and a fragmentary portion of the tank taken along the line 4—4 of FIG. 2.

The boiler 12 is shown more clearly in FIG. 4 and in the preferred embodiment illustrated herein consists of two housing elements 39 and 40. A wall 41 disposed between the housing elements 39 and 40 includes a peripheral seal 42 which is releasably clamped between the outer rims of the housing elements 39 and 40 by clips 43 at the periphery of the boiler 12. This arrangement completely seals the boiler formed by the housing element 39 and the wall 41. The whole boiler can be readily disassembled for cleaning. The heating elements 13 and 14 in the illustrated embodiment are carried by the wall 41 and are connected in series by a lead 44 connecting one terminal of one heater to one terminal of the other heater. The power line 45 has one lead 46 connected to the other terminal of the heater 14 while the second lead 47 is connected through a thermostat 48 to the other terminal of the heater 13. The thermostat is mounted on a bracket 49 in close proximity to the heaters 13. In the event the heater 13 reaches a temperature above the normal operating temperature, the thermostat will operate to open the circuit and de-energize both heaters 13 and 14. It is evident, however, that the heaters 13 and 14 could be arranged for parallel operating or in the alternative a single electric heater may be employed in the boiler provided however it delivers the quantity of heat necessary for operation of the distillation apparatus.

Included in the boiler is the ozone generator 120. Preferably, the ozone generator is inserted into the boiler through a port in housing element 39. As illustrated in FIG. 1, the ozone generator 120 is powered by transformer 121. It is not necessary, however, to have a separate power supply for the ozone generating means. The ozone generator may be powered by the same power supply used to operate heaters 13 and 14.

Figure 3:
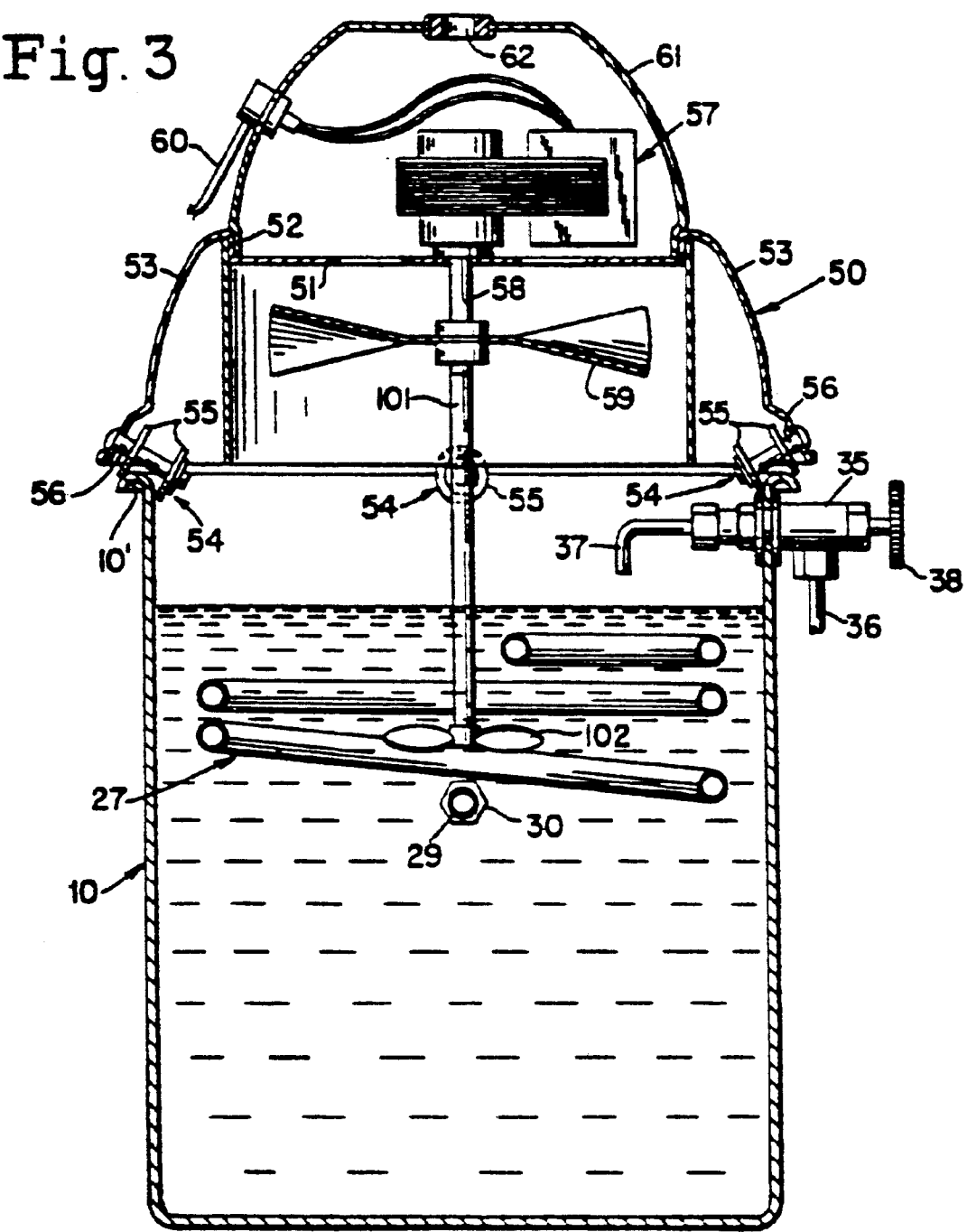
FIG. 3 is a cross sectional view of FIG. 1 taken along the line 3—3 thereof and illustrates air circulating means carried by the container.

In the preferred embodiment of the invention herein illustrated a forced air circulation means assists removal of steam and undesirable vapors liberated from the reservoir water within reservoir container 10. The air circulating means which is shown in FIG. 3 comprises an inverted dished cover generally denoted by the numeral 50 over reservoir container 10 which includes a flat upper wall 51 that is perforated or apertured, an upwardly extending peripheral wall 52 and a downwardly curved peripheral wall 53. The lower peripheral edge of the wall 53 carries three or more diagonally disposed rollers 54 each having spaced discs 55 rotatably carried by a shaft 56. The discs 55 engage the rolled edge 10' of the reservoir container 10 and accordingly provide an annular vent between the cover 50 and the top edge of the reservoir container 10.

The flat apertured wall 51 of the air circulating means supports an electric motor generally denoted by the numeral 57 which powers a shaft 58 extending through the perforated wall 51. The fan 59 is mounted on shaft 58. Power is fed to the motor 57 by a cable 60 connected in a conventional manner to the motor. If desired, switch means may be provided for operation of the fan. The fan motor 57 is covered by a vented dome-shaped housing 61 that is securely fitted to the cover 50 and is attached thereto by any suitable means. In the illustrated embodiment of the invention, the dome-shaped housing 61 frictionally engages the peripheral wall 52 of the cover 50.

In one mode of fan operation, air is drawn into the air circulating means assembly through an opening 62 in the dome-shaped housing 61 and then down through the perforated wall 51 whereupon it is directed downwardly over the reservoir water in reservoir container 10 and thereafter is discharged through the annular opening between the reservoir container 10 and its cover 50. In the reverse mode of fan operation the fan 59 draws air in through the annular opening between reservoir container 10 and its cover 50 up through perforated wall 51 and opening out through vent 62 in motor housing 61.

As may be seen in FIG. 3, a stirrer rod 101 extends from an integral connection with motor shaft 58 at the hub of fan 59 preferably but not necessarily axially of the cylindrical reservoir region 100 inside of condenser coil 27 and terminates at the stirrer blades 102 immersed in the reservoir water. The depth of immersion for stirrer blades 102 is not critical, but preferably, they are not deeper than the bottom of coil condenser 27. In the mode illustrated herein, the stirrer rod was positioned modestly off-center to avoid interference with the outlet bend 29 of condenser coil 27, see FIGS. 1 and 2.

In the operation of the distillation apparatus of this invention, the reservoir container 10 and boiler 12 are first filled with water to a level at least substantially covering the heating elements 13 and 14 as may be observed most clearly in FIG. 2. It will be observed that when filling reservoir container 10, water will automatically flow through conduit 22 into the boiler so that ultimately the level of the water in the reservoir container 10 will be the same as the water level in the boiler 12. When energy is then supplied to the heating elements 13 and 14 they will function to boil the water within the boiler 12. Oxygen in the air above the water is turned to ozone by ozone generator 120. Steam generated from heating elements 13 and 14 rises through the ozone and enters inlet 24. The steam then flows through the condenser coil 27 to be condensed therein. The condensed steam will then discharge through filter 115 as the distillate (liquid) product from the condenser outlet 31. When first operating the distillation apparatus, it is generally desirable to discard the distillate product until the water inside reservoir container 10 has attained a normal operating temperature which preferably is 180.degree.–190.degree. F. (which is rapidly attained). Heaters 13 and 14 are designed to heat the water within the boiler at a rate faster than the condenser coil 27 can accommodate the steam produced. Accordingly, a head of steam is developed within the boiler 12 and the steam pressure will force liquid from the boiler back through the conduit 22 into the reservoir container 10 thereby relieving the steam pressure. The flow of the water from the boiler into conduit 22 generates a vacuum in the boiler. The vacuum causes air to be drawn through filter 115 into the condenser outlet 31, traveling through the condenser and exiting in the boiler via outlet 24 and thereby providing fresh oxygen for the ozone generator 120. As soon as the steam pressure within the boiler is relieved, water will again flow through the conduit 22 back into the boiler with the result that there will be a periodic reversal of water flow through the conduit 22 and air flow through the condenser 27. This pulsating action results in a more rapid increase in temperature of the reservoir water within the container 10 by contributing heat over and above the heat imparted to the reservoir water by the action of the condenser coil 27. It also results in a constant renewing of ozone in the boiler. The temperature of the reservoir water, however, is always below the boiling temperature (of the water in boiler 12) so that distillate will be condensed in condenser 27. Preferably the reservoir water should be kept in the range of 180.degree. F. to 190.degree. F. This temperature level will boil off undesirable components from the reservoir water (prior to actual distillation thereof), and also serves to operate condenser 27 adequately. To maintain proper operation of the apparatus, a substantial proportion of the feed water which enters at the inlet 37 ultimately is discharged as overflow through tube 32 and outlet 35.

Figure 5:
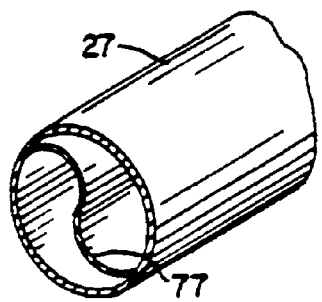
FIG. 5 is a diagrammatic view showing the condenser tube containing a deflector.
Figure 6:
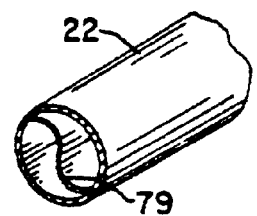
FIG. 6 is a diagrammatic view showing the fluid conduit containing a deflector.

As has already been pointed out, a mechanical expedient to facilitate maintenance of a distinct temperature across the condenser coil tubing is illustrated in FIG. 5. Shown there is an enlarged partial cross-section of condenser coil tubing. Inside the tubing is a deflector 77 whose purpose is to generate spiral flow movement of steam and condensate to the tube wall. Also, flow becomes more turbulent thereby helping heat exchange across the tube wall. A like deflector 79 may be provided in the conduit connecting reservoir container 10 and boiler 12 (see FIG. 6). The purpose of deflector 77 is, of course, to create turbulent mixing of the water so as to avoid any temperature stratification either in reservoir container 10 or in boiler 12.

An additional optional expedient which has been found advantageous in practice of this invention is the provision of a filter, preferably an oversized filter, at the condenser outlet 31. In the embodiment illustrated herein the oversized filter 115 is a carbon filter.

Filter 115 absorbs any organic materials that are carried over with the condensate. It polishes the condensate, so to speak but also it achieves a superior aeration for the condensate.

As has already been pointed out the distillation apparatus of this invention operates in a pulsating fashion causing water to flow through the connecting conduit 22 back and forth between boiler 12 and reservoir 12. The same pulsations affect condenser 27. A pulse of (steam) pressure from boiler 12 passes through the condenser tubing in a forward direction during a steam generation pulse, sending condensate out through filter 115. Then during the reverse suction pulse, air is drawn into the filter 115, through the condenser, into the boiler. Thus, the filter 115 acts as much to filter air drawn into the condenser tubing, as it does to filter distillate leaving the condenser tubing.

Manifestly, the pulses are not equal in their effect. Steam is being generated in boiler 12, then is condensed in condenser coil 27. The distillate is discharged at the outlet 31 through filter 115. A net movement outflow movement of distilled water through filter 115 results. At the same time, a small net inflow of air into filter 115 and condenser 27 results. The distillate, e.g., at 190.degree.–195.degree. F., is hot enough to heat filter 115 and prevents microbial contamination of the filter. This means that air which enters oversized filter 115 during the suction pulses is retained therein and becomes sterilized by the hot filter before entering condenser 27 and/or becoming absorbed in the distillate. The reason for providing a filter 115 that is oversized is precisely to increase the residence time therein of the inflowing air. Overall, the result is that air heated and sterilized in filter 115 partially aerates the distilled water improving the palatability thereof.

While only certain embodiments of the invention have been illustrated and described herein, it is understood that alterations, changes, and modifications may be made therein without departing from the true scope and spirit thereof.

I claim:

1. A method for producing a distilled water product which comprises:

providing a distillation apparatus comprising a water reservoir container having a water inlet and outlet thereto connected so as to create a reservoir of water therein and a boiler smaller than the reservoir container with an open connection between container and boiler for water flow to or from the boiler, a steam line overhead of the water level in the boiler leading to a condenser immersed in the reservoir, an outlet from said condenser to discharge condensate and an ozone generator in said boiler; and maintaining a predetermined level of reservoir water by introducing feed water into and removing water from said container at a flow rate which maintains a temperature in the range of about 180°–190° F. in the reservoir and heating the water in said boiler to generate steam, the steam passing through ozone generated by said ozone generator and passing into said condenser to be condensed therein by heat exchange against the reservoir water whereby the reservoir water becomes heated and the heated reservoir water becomes devolatilized and deaerated prior to entering said boiler.

2. The method of claim 1 wherein the boiler periodically generates more steam than can be accommodated by the condenser thereby causing a pulsation wherein water is forced to flow out of the boiler back into the reservoir by steam pressure, and the steam pressure pulse is dissipated whereupon water flows back into the boiler from the reservoir, said pulsation also causing periodic flow of condensate out of the condenser and periodic flow of air into said boiler.

3. The method of claim 2 further comprising stirring the water in said reservoir with a mechanical stirrer.

4. The method of claim 3 further comprising providing a filter at the outlet of said condenser.

* * * * *